March 19, 1957   R. H. RINES   2,786,132
POWER TRANSMISSION
Filed Nov. 21, 1946   6 Sheets-Sheet 1

Fig. 1.

INVENTOR.
Robert H. Rines
BY
ATTORNEY.

March 19, 1957  R. H. RINES  2,786,132
POWER TRANSMISSION
Filed Nov. 21, 1946  6 Sheets-Sheet 2

INVENTOR.
Robert H. Rines
BY
David Rines
ATTORNEY.

INVENTOR.
Robert H. Rines
BY David Rines
ATTORNEY.

March 19, 1957 R. H. RINES 2,786,132
POWER TRANSMISSION
Filed Nov. 21, 1946 6 Sheets-Sheet 5

INVENTOR.
Robert H. Rines
BY
ATTORNEY

March 19, 1957     R. H. RINES     2,786,132
POWER TRANSMISSION Filed Nov. 21, 1946     6 Sheets-Sheet 6

INVENTOR.
Robert H. Rines
BY
*David Rines*
ATTORNEY.

United States Patent Office 2,786,132
Patented Mar. 19, 1957

2,786,132

POWER TRANSMISSION

Robert Harvey Rines, Brookline, Mass.

Application November 21, 1946, Serial No. 711,319

30 Claims. (Cl. 250—2)

The present invention relates to power transmission, and more particularly to power transmission at ultra-high frequencies.

Ultra-high-frequency high-peak power is attainable at the present day with the aid of magnetrons or other radio-high-frequency transmitters operable at intervals to produce very short pulses. The pulsed radio waves may be directed along very narrow beams with the aid of directive antennas. This however, yields pulsed transmission only. Pulsed transmission is usable for communication, radio location and similar purposes, but it is not adapted for power transmission. Very high power in the megawatt region cannot, as yet, be obtained for continuous transmission.

An object of the present invention, therefore, is practically to transmit high power continuously, rather than in pulses.

Another object is to transmit both alternating-current and constant average current high power without the aid of present-day power-transmission lines.

A further object is to provide a transmitting and relaying system for high-power radio-energy.

Other and further objects will be explained hereinafter and will be particularly pointed out in the appended claims.

The invention will now be more particularly explained in connection with the accompanying drawings, in which.

Figure 1:
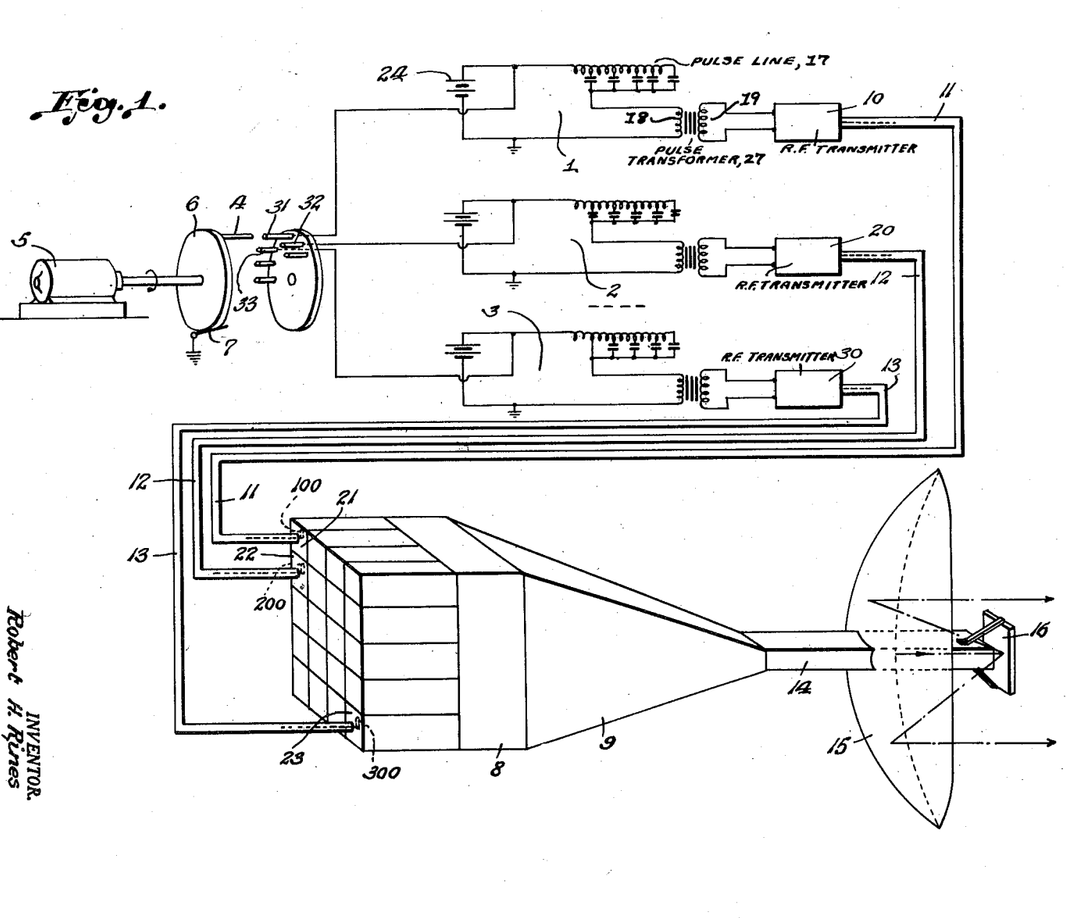
Fig. 1 is a diagrammatic view of transmitting apparatus embodying the invention, in preferred form.

A series of high-peak-power radio-frequency transmitters 10, 20, 30, etc., such as magnetrons or other ultra-high-frequency, high-peak-power generators or oscillators are shown triggered successively by pulse-generating circuits 1, 2, 3, etc., respectively. The transmitters therefore operate successively for a short period of time, say, for two micro-seconds, producing successive bursts of radio-frequency oscillations during the application of the triggering pulses. These oscillations have high power in the megawatt region.

The transmitters 10, 20, 30, etc., feed their outputs through respective transmission lines, such as coaxial lines 11, 12, 13, etc., to respective antennas 100, 200, 300, etc., located in respective wave-guide channels 21, 22, 23, etc. The wave-guide channels 21, 22, 23, etc., feed into a common wave-guide 8, that is shown tapering at 9 into a common output wave-guide 14. The wave-guide 14 is shown extending through a paraboloidal reflector 15 of a directive antenna system having also a secondary reflector 16. Radio-energy, traveling along the wave-guide 14 from the antennas 100, 200, 300, etc., will reflect from the secondary reflector 16 to the paraboloidal reflector 15. The paraboloidal reflector 15 will then direct the radio waves out into space as a directive beam.

Though the wave-guide channels 21, 22, 23, 8, 9, 14, etc., are shown of rectangular cross section, circular, elliptical and other shapes of guides, of course, may also be used. If desired, dielectrics of varying sizes may be inserted in the channels 21, 22, 23, etc., as is well-known in the art, to compensate for any phase differences in the energy from the various channels at the common guide 14, as a result of differing path lengths in the guiding system.

The antennas 100, 200, 300, etc., are shown vertically oriented to support, for example, "TE" modes of waves, say the $TE_{0,1}$ wave, in guides 21, 22, 23, etc., and the common output guide 14. The radio waves transmitted into space by the reflector 15 will therefore be vertically polarized.

Figure 2:
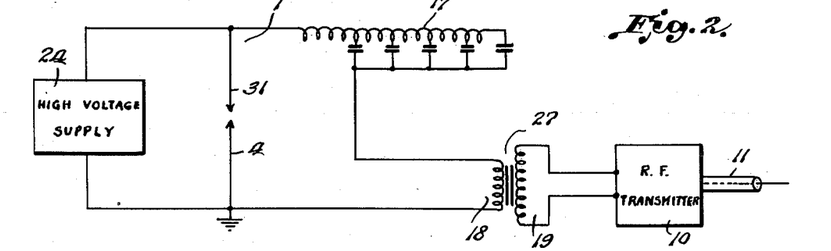
Fig. 2 is a similar fragmentary view illustrating a principle of the invention.
Figure 3:
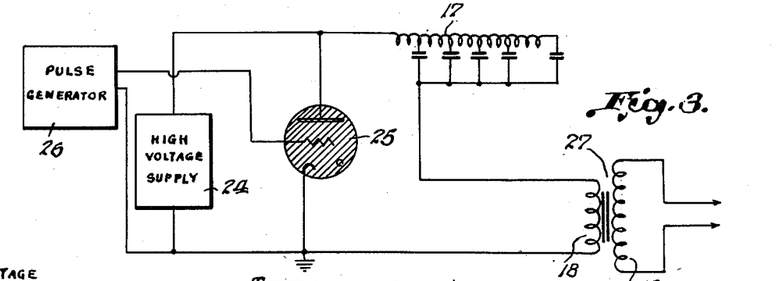
Fig. 3 is a view similar to Fig. 2 of a modification.

The transmitter 10 is shown, in Figs. 1 and 2, provided with a two-electrode spark gap the two cooperating electrodes of which are indicated at 4 and 31. The spark-gap electrode 4 is shown mounted upon a rotatable disc 6 that contacts with a grounded brush 7. The transmitter 20 is shown in Fig. 1 provided with a two-electrode spark gap one of the electrodes of which is the same grounded electrode 4 and the cooperating electrode of which is indicated at 32. The transmitter 30 is similarly shown provided with a two-electrode spark gap 4, 33; and so on. The spark gaps may, however, be replaced by equivalent mechanism. In Fig. 3, for example, the spark gap 4, 31 of the transmitter 10 is shown replaced by a thyratron tube 25.

The transmitters 10, 20, 30, etc., are provided with triggering pulses from respective pulse-generating circuits. The transmitter 10, for example, may be triggered by a pulse generator 1, comprising a high-voltage direct-current supply 24, which may or may not be series-resonant, charging an artificial pulse-transmission line 17. When the voltage of the pulse generator 1 builds up to a specified value, the spark gap 4, 31 may break down, grounding the high side of the pulse line 17; or the high side of the pulse line 17 may be grounded by the thyratron tube 25, Fig. 3, upon rendering it conductive in response to the action of an external pulse generator 26, such as a multivibrator. The resulting voltage surge in the line travels down the line 17, is reflected at the open or right-hand end, and comes back out of phase, dissipating the voltage across the spark gap or the thyratron 25.

A direct-current-voltage triggering pulse is thus produced in the primary winding 18 of a pulse transformer 27, the secondary winding 19 of which steps it up for delivery between the cathode and the plate or anode of the magnetron transmitter 10.

In the preferred system of Fig. 1, the spark-gap electrodes 31, 32, 33, etc., are shown arranged along the arc of a circle, so as to be caused to spark successively as the cooperating spark-gap-electrode member 4 is rotated past them by a motor 5. The pulse-generating circuit 1 will be thus rendered effective when the spark-gap electrode 4 passes the spark-gap electrode 31. The transmitter 10 will therefore be set suddenly into radio-frequency oscillation for the duration of the triggering pulse, to produce a high-power burst or pulse of radio-frequency oscillations 41, Fig. 4, along the coaxial-line wave-guide 11. The duration or width $\tau$ of the radio-frequency burst or pulse 41 will depend on the time constants of the pulse line 17, which determine the time required for the voltage surge to travel out and back along the pulse line 17 to produce the triggering pulse for the magnetron. The high-power radio-frequency-energy burst or pulse fed by the coaxial-line 11 to the antenna 100 is thus launched by the antenna 100 into the wave-guide channel 21, whence it will pass into the common guides 8, 9 and 14 to be radiated into space directively by the reflector 15.

Figures 4, 5:
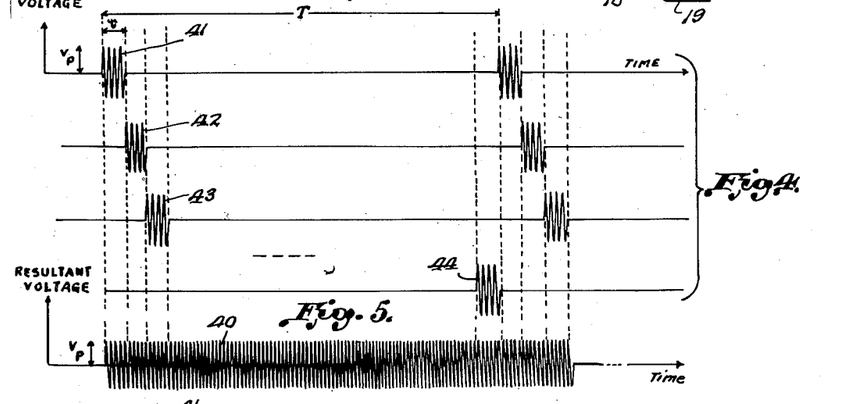
Figs. 4 to 8 are views of explanatory diagrams.

The spark-gap electrode 4 will then move past the co-operating spark-gap electrode 32 of the pulse-generating circuit 2 to produce a triggering pulse therein, thereby to trigger the transmitter 20 to produce a radio-frequency pulse 42, Fig. 4. If the timing of the pulses of the successively operating transmitters 10 and 20 are suitably synchronized, as by means of the circular arrangement of electrodes 31, 32, 33, etc., the pulse 42 from the transmitter 20 will occur directly after the pulse 41 from the transmitter 10, without any break between them.

Directly after the pulse 41, the radio pulse 42 will be launched by the antenna 200 in the wave-guide channel 22 and then, in the manner already described, through the common wave-guides 8, 9, and 14, out into space, as directed by the reflector 15.

The transmitter 30 will similarly be triggered by the pulse-generating circuit 3 when the spark-gap electrode 4 passes the cooperating spark-gap electrode 33 to produce a radio pulse 43. Through similar synchronization, as by proper spacing of the spark-gap electrodes 32 and 33, the pulse 43 will similarly, directly after the pulse 42, be caused to be transmitted by the antenna 300 into the wave-guide channel 23, and then, through the common guides 8, 9 and 14, out into space.

The synchronizing of the generating circuits producing successive triggering pulses and the resultant synchronizing of the successive pulse outputs of the successive transmitters thus insures the generating of a continuous train of pulses occurring successively without break.

Though only three pulse-generating systems 1, 2 and 3, are illustrated, this is for the purpose only of not confusing the disclosure. In practice, a large number of pulse-generating systems will be employed, thus to produce successive high-power radio pulses 41, 42, 43, 44, etc., Fig. 4, in repetitive sequence, each occurring immediately after the preceding pulse, and without any break between the successive pulses. The effect will be, after combining the pulses in the common channel, to radiate the high-power radio-energy pulses in the form of a continuous-wave continuous-level ultra-high-frequency directive beam of high-power radio energy out into space from the paraboloidal reflector 15 of the directive antenna system. If the pulses are of substantially equal high-peak power $V_p$, the radiated energy will have a resultant radio-frequency voltage 40 of a continuous constant-level $V_p$, as shown in Fig. 5.

Figure 6:
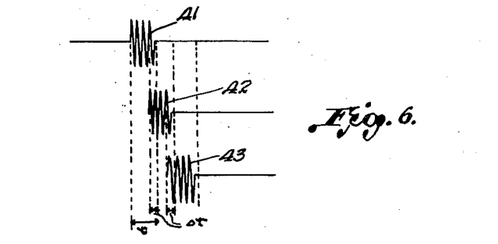

To guard against any possible breaks or gaps between the operation of successive transmitters, the spark-gap electrodes 31, 32, 33, etc., may be spaced closer together to cause the transmitter 20, for example, to oscillate a small time $\Delta \tau$, Fig. 6, before the preceding transmitter 10 has ceased its own oscillations 41. The transmitter 30 will similarly start oscillating a small time $\Delta \tau$ before the preceding transmitter 20 has ceased its oscillation 42, and so on.

As an illustration, let it be assumed that $n$ radio-frequency transmitters 10, 20, 30, etc., of wavelength $\lambda$ are successively pulsed, each for $\tau$ microseconds, and that there are, correspondingly, $n$ wave-guide channels 21, 22, 23, etc. The motor 5 may rotate the disc 6 one revolution in approximately $n\tau$ microseconds. If the $n$ guide channels 21, 22, 23, etc., are of rectangular cross-section, excited by vertically disposed antennas 100, 200, 300, etc., as shown, electromagnetic waves have a "TE" field configuration, say, the $TE_{0,1}$ mode, may be successively launched into the respective wave-guide channels as the respective launching antennas are energized from the respective transmitters. A paraboloidal antenna-reflector 15 of aperture $m$ times the operating wavelength $\lambda$ will then impart to the radio energy transmitted directively into space a gain of about $10m^2$ over the energy that would be radiated by a simple dipole radiator.

Figure 7:
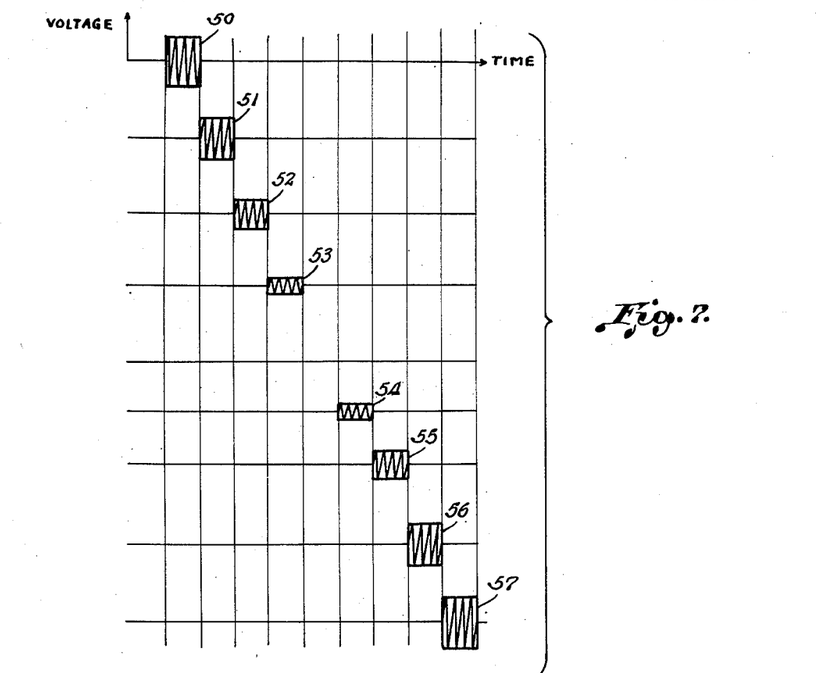
Figure 8:
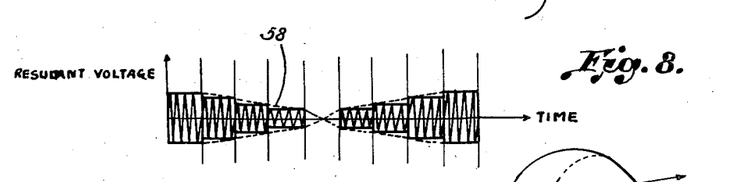

By producing in the successively operating transmitters successive radio-pulse voltages of successively varying amplitudes or periodically changing level, as shown at 50, 51, 52, 53, 54, 55, 56 and 57, in Fig. 7, an alternating high-power radio-energy voltage may be produced, as shown at 58 in Fig. 8. This may be effected by, for example, supplying different-magnitude direct-current-supply voltages in the successive pulse-triggering systems 1, 2, 3, etc., by using different numbers of secondary windings in the successive pulse transformers, or in any other convenient manner. The frequency of the alternating wave, say, for example, 60 cycles per second, may be predetermined by suitably designing the successive voltages in the networks to produce the varying-amplitude pattern of successive networks in any desired repetitive sequency, for example, as shown in Fig. 7.

Figure 9:
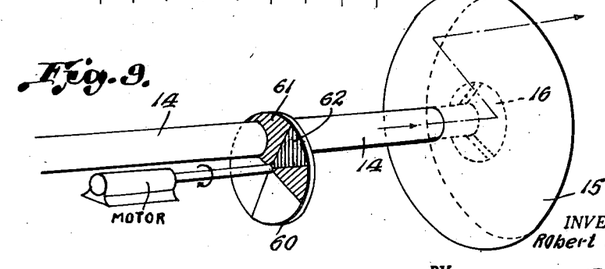
Fig. 9 is a perspective of a further modification.

The alternating-current high-power radio-energy level may also be produced from the constant-level high-power energy 40, Fig. 5, by inserting material in the common output guide 14 to modulate the constant-level radio energy. If, for example, the guide 14 is of circular cross-section, a disk 60 having varying thicknesses 61, 62, etc., of dielectrics, as illustrated in Fig. 9, may be rotated through the common guide 14 to absorb varying amounts of energy.

The directive beam of continuous-level or alternating-level high-power electromagnetic energy radiated by the reflector 15 in the system of Fig. 1 may be produced optionally by any other type of directive system, such as dielectric or wave-guide lenses. The transmitters may also be modulated with signal voltages to produce any desired voltage characteristic, as is well known in the radio art.

Figures 10, 11, 12:
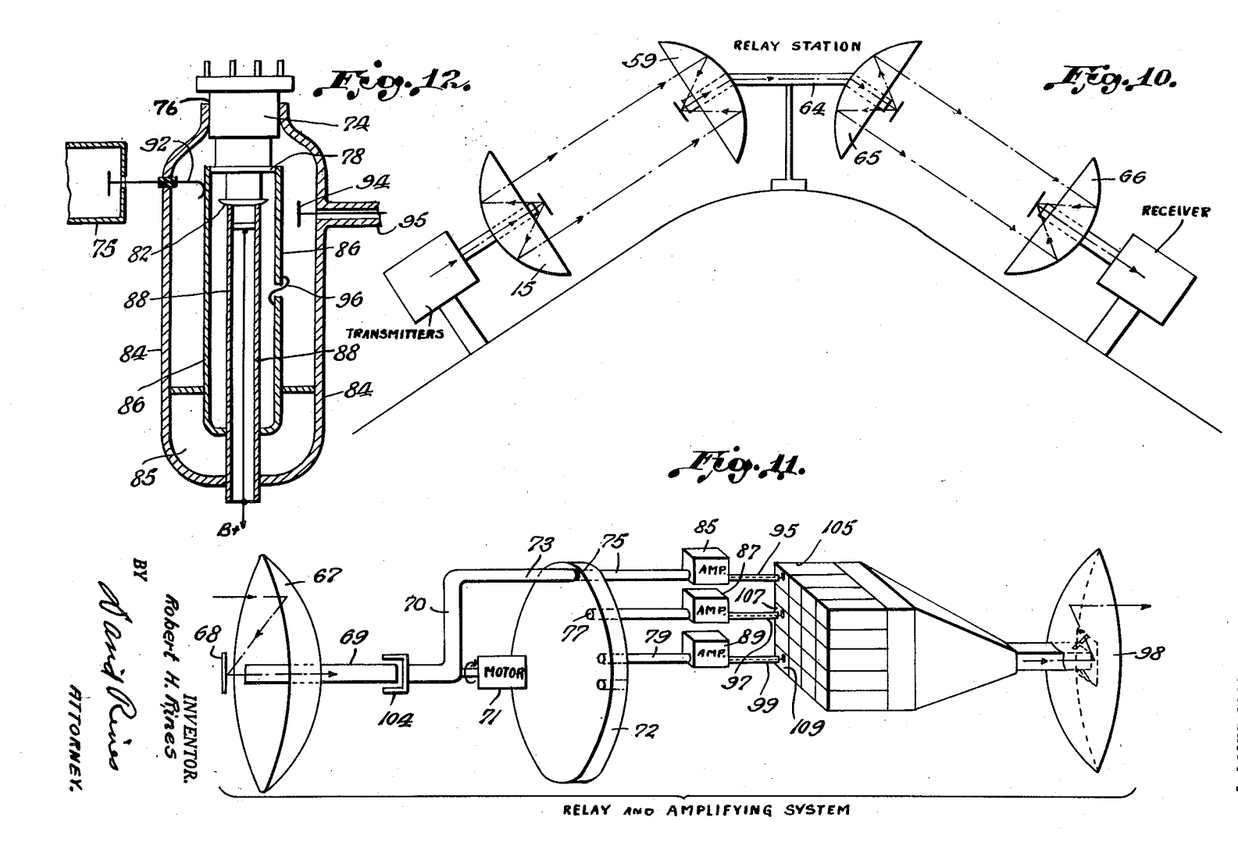
Figs. 10 and 11 are diagrammatic views of modifications of the transmitting relaying and receiving stations.
Fig. 12 is a fragmentary view of one of the amplifier systems illustrated diagrammatically in Fig. 11.

The high-power energy from the transmitting-system reflector 15 may be transmitted to a directive receiving reflector 59, Fig. 10, of a relay station. The waves may then pass through a circular wave guide 64 at the relay station, to be reradiated from a relaying reflector 65 towards a desired receiving station 66. The transmission of high-power high-frequency energy may thus be accomplished over large distances and over irregular terrain.

Figure 13:
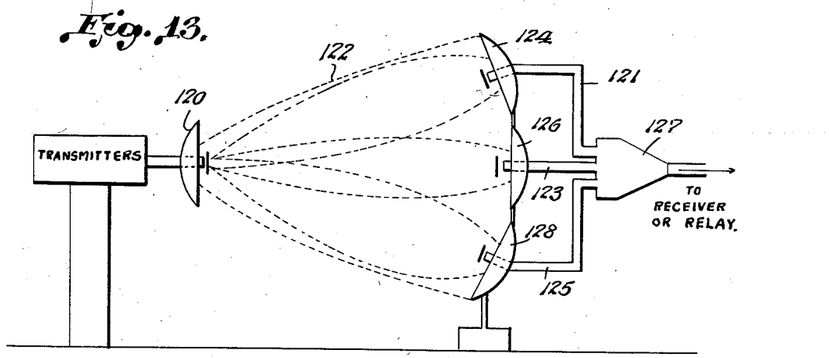
Figs. 13 to 16 are diagrammatic views of modifications of power-transmitting and receiving stations.

In order to insure, for power-transmission purposes, that most of the energy transmitted by a transmitter 120 shall be intercepted by the receiving or relay antenna system, subject to the attenuation in air of the radio waves, a plurality of receiving antennas 124, 126, 128, etc., shown in Fig. 13, may be disposed about the receiving area at various displaced positions. Let it be assumed, for example, that the vertical radiation field pattern or lobe contour 122 of the transmitting antenna 120 represents distances from the transmitting station for all angles in the vertical plane where a constant field strength is received of sufficient magnitude for power-transmission purposes. If it is desired to intercept most of this lobe energy, for example, at the half-voltage or half-power regions, the receiving antennas 124, 126, 128 are disposed and oriented so that their reception lobe patterns, for the given field strength, intercept substantially all of the radiated energy. The lengths of wave-guide-receiving elements 121, 123 and 125 associated, respectively, with the paraboloidal-antenna reflectors 124, 126 and 128 may be adjusted to insure that all the systems shall feed energy to the common guide 127, simultaneously.

Interception of the transmitted energy may also be effected in the horizontal plane by a horizontal array of antennas (not shown) similar to the antennas of Fig. 13, thus providing a plurality of arrays in two or three dimensions.

Figure 14:
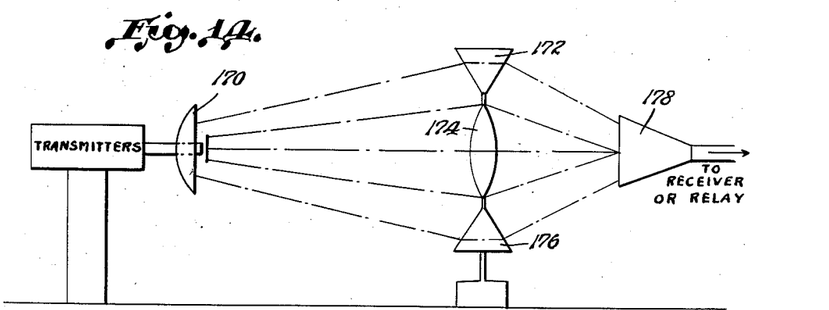

Instead of directive antennas constituted of geometrical reflecting systems, arrays of dielectric lenses, prisms and other refractors, as of pitch, polystyrene and other dielectric substances, may be used to intercept the transmitted energy and refract the rays to a common reception point. Metallic wave-guide lenses, of course, may also be used. Dielectric prisms 172 and 176 may cooperate with a dielectric lens 174 to refract the energy from the transmitter 170 to an electromagnetic horn receiver, shown as a pyramidal horn 178 in Fig. 14.

There are several sources of losses in power. One source resides in the attenuation of the radio waves, as they pass through the atmosphere. Another arises out of the fact that, if ony a few receiving antennas are used, not all of the energy can be intercepted by the receiving antennas, owing to the divergence of the radio beam. Such losses may be compensated for by amplifying the waves in the process of relaying them. No high-frequency oscillators are available, however, for amplification purposes which can produce continuous high-power outputs. The incoming constant-level or alternating-level high-power may, however, again be broken up into short pulses, and the short pulses may be amplified at high power and then recombined to produce an amplified constant or alternating-level continuous high-power output. This will be understood by reference to the system shown in Fig. 11.

A receiving reflector 67 at a relay station, for example, may converge the waves to a secondary reflector 68, whence they may travel into a circular wave guide 69, as before described in connection with Fig. 10. A Z-shaped wave-guiding section 70 further guides the waves from the guide 69. The Z-shaped guide section 70 is rotatable by a motor 71 to present its mouth at the end of the portion 73, along a circular arc, to a series of circular wave-guide channels 75, 77, 79, etc., mounted upon a support 72. The guide channels 75, 77, 79, etc., feed into respective radio-frequency pulse amplifiers 85, 87, 89, etc. Since the mouth 73 of the guide 70 sweeps by the guide channels 75, 77, 79, etc., successively, only a burst of the continuous-level radio energy received by the relay-station antenna 67, and propagated in the guide 70, can appear, at any particular time, in any particular guide channel. The channel 75, for example, will receive a pulse of radio-energy, then the guide 77, then the guide 79, and so on. The channels thus feed the respective radio-pulse amplifiers 85, 87, 89, etc., to produce amplified outputs of pulsed radio energy.

The guide 70 is provided with a choke-flange extension 104, shown extending at a distance equal to a quarter of the wavelength of the radio waves being employed along the outside of the guide 69, to provide a rotating joint. Though the extension 104 does not make physical contact with the guide 69, it effectively makes electrical contact, since an open-circuited quarter-wave-length line behaves as a low impedance or short-circuit. Little energy is therefore lost by virtue of the fact that there exists a rotating joint between the guides 69 and 70. At frequencies of the order of 10,000 megacycles per second, power leakage for such joints has been found to be less than 0.3 decibel. Similar sections of choke-flanges, not shown, may be used at the mouth 73 and the mouths of the guide channels, 75, 77, 79, etc., similarly to prevent energy losses.

It now remains to recombine the amplified radio-pulsed energy into, say, continuous or constant-level radio energy for retransmission purposes. To this end, the output of the amplifier 85 may be fed by a coaxial line 95 to launch a pulse of energy in a guide channel 105, whence the pulse may be retransmitted from a reflector 98, similar to the reflecting system 15 of Fig. 1. Following directly after the pulse from the amplifier 85, a radio pulse from the amplifier 87 will be launched in a guide channel 107 by way of a coaxial feeder 97. Following directly after the pulse from the amplifier 87, the pulse from the amplifier 89 may be transmitted by way of a coaxial line 99 into a guide channel 109, and so on. These pulses will all be radiated into space by the reflector 98. Constant-level radio energy will thus be retransmitted from the antenna reflector 98, the energy being amplified from its original state when it reached the relay station at the reflector 67, and restored to high-power level.

The amplifiers 85, 87, 89, etc., may be constituted of resonant-cavity oscillators, operating with "lighthouse tubes," such as the General Electric Co. "2C43," as shown schematically at 74 Fig. 12. The cathode contact 76 of the tube makes connection with an outer cylindrical tube 84, the grid contact 78 contacts with an inner cylinder 86, and the plate or anode contact 82 contacts with still another inner cylinder 88. The cylinders are of length resonant to the radio-frequency energy to be used, and the cavities formed between the cylinders behave as tuned oscillating circuits. A feed-back loop 96 is shown extending from the grid-plate cavity, between the cylinders 88 and 86, to within the cathode-grid cavity, between the cylinders 84 and 86. Input radio energy from the circular wave-guide 75, Figs. 11 and 12, which may, for example, be operating with radio waves having a $TE_{1,1}$ configuration, is coupled into the amplifier 85 by a probe 92 that extends from within the wave-guide 75 to the grid cylinder 86. The amplified output energy is coupled to the coaxial line 95 by a coupling loop 94 that extends within the grid-cathode cavity. Any similar cavity resonators may be used, as described, for example, in an article by J. Guarrera, entitled, "Tunable Microwave Cavity Resonators," on page 80 of Electronic Industries, March 1946. Other cavity resonators, such as klystrons or magnetrons may also be used as amplifiers, as is well-known in the art.

Instead of employing free-space propagation, high-power radio-frequency energy may also be propagated along low-loss transmission lines, particularly dielectric wave-guides, with little attenuation and no radiation loss.

Figure 15:
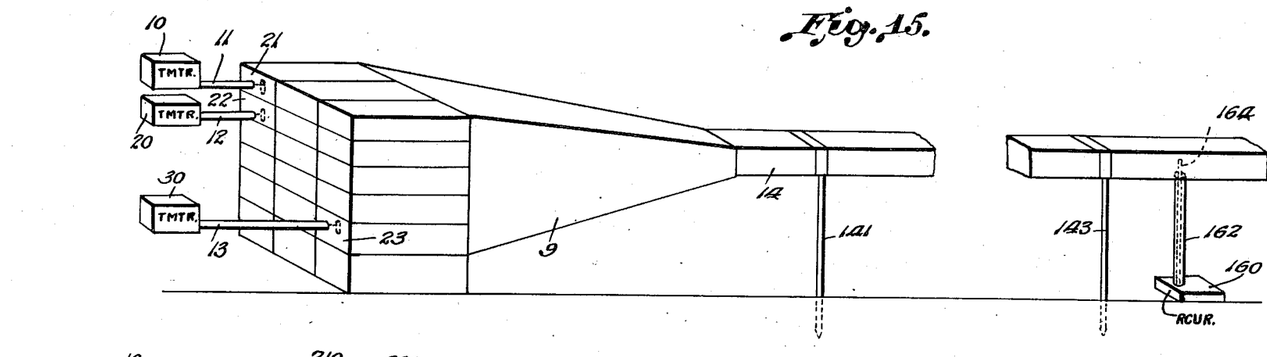

A plurality of pulse transmitters 10, 20, 30, etc., are shown in Fig. 15 successively exciting rectangular wave-guides 21, 22, 23, etc., as in Fig. 1, and feeding through the tapering common guide 9 to a guide line 14 for carrying the energy over large distances. The wave-guide line 14 may be buried in the ground or supported on supports, as shown in 141 and 143. It may also be laid on the beds of or underneath bodies of water.

At desired points along the line 14, a receiver station may tap into the line to remove power for some purpose. If, as shown, a "TE" mode is excited in the guides—say, the $TE_{0,1}$ wave, having a vertical component of electric field but no component in the direction of propagation—then vertical probes, such as shown at 164, from tap-off lines, may be inserted into the power line 14 to take energy off to the receiver station 160. The probe 164 may be of the coaxial type, as shown at 162.

The attenuation of a $TE_{0,1}$ wave of 10,000 megacycles frequency propagated in a rectangular guide has been found to be only 0.02 decibel per foot; and, at 3,000 megacycles, is 0.006 decibel per foot.

Figure 16:
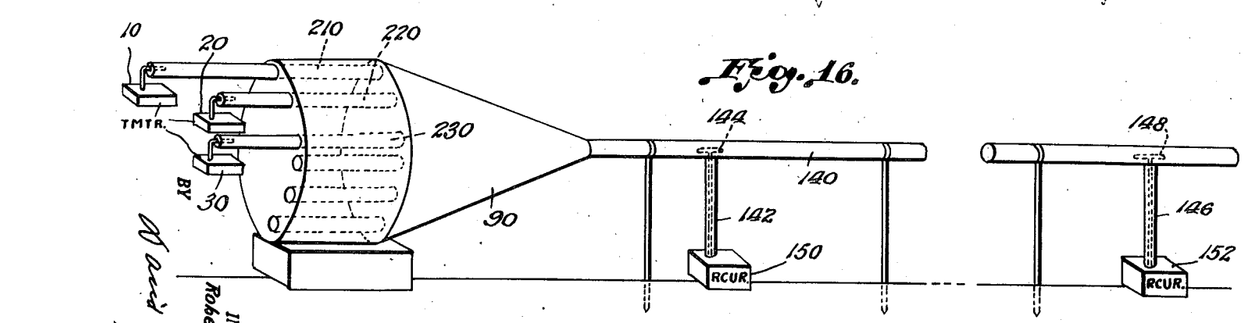

Circular or any other type of wave-guide transmission lines may also be used, as illustrated in Fig. 16. A plurality of pulse transmitters 10, 20, 30, etc., similar to those of Fig. 1, may successively feed pulses to respective wave-guides of a plurality of circular wave-guides 210, 220, 230, etc. The resultant radio energy passes into a common tapering conical guide 90, similar to the rectangular tapering guide 9 in Fig. 1, and is carried for long distances in a circular wave-guide line 140.

At any desired points along the line, a receiver station may tap into the line to remove power for some purpose. If, as shown, a "TM" mode is excited in the guides—say, the $TM_{0,1}$ wave, having a radial component of electric field and a component in the direction of propagation—then probes such as 144 and 148 from tap-off transmission lines, perhaps of the coaxial type, as shown at 142 and 146, may be inserted into the power line 140 to take energy off to receiver stations 150 and 152.

The relay-and-amplifying system of Fig. 11 may also be applied to the systems of Figs. 15 and 16. The wave-guide 69 may receive energy from the line 140, instead of from waves received by the reflector 67, for example, and the output common guide, shown feeding the retransmitting reflector 98, may then feed into the line 14, for propagation therealong, as in Fig. 15.

The high-power radio energy may be received at a receiving station, as shown in Fig. 10, and used directly for commercial radio-frequency welding, heating, etc., and for other industrial purposes. The energy may also be rectified and used for any desired purposes, such as home-lighting, etc.

In the latter application, the radio receiver must be capable of handling the high-power radio-frequency energy and producing usable rectified current; or, in the case of alternating-level high-power radio energy, usable alternating current.

Figure 17:
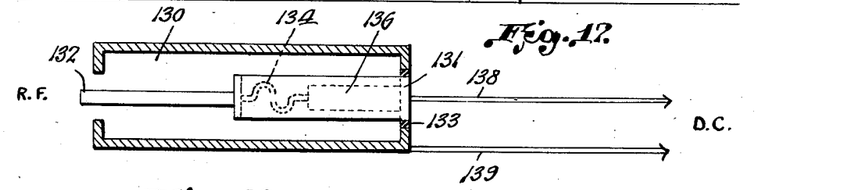
Figs. 17 and 18 are diagrammatic views of a receiver.

Though any other high-frequency high-power radio-receiving-and-rectifying system may be used, the receiver shown in Fig. 17, constructed of elements that will withstand the high-power energy, is preferred. It comprises a resonant chamber 130, to which the radio-frequency energy is coupled by a probe 132. A very large slab of silicon, germanium or other radio-rectifying material 136 contacts with the conductor 132 at one end, through a strong wire element 134, and with an electrode 131 at the other end. This rectifying member is similar to the well-known high-radio-frequency crystal-cartridge detectors, though of larger dimensions and more rugged construction to carry the high powers employed according to this invention. It is well known that such detecting materials as silicon produce a rectified current proportional to the radio-frequency power input. Insulation strips 133 serve as radio-frequency by-pass condensers with the crystal electrode 131 and the outer conductor of the chamber 130. High-current-carrying conductors 138 and 139 serve as the conductors to carry off the rectified voltage. Further smoothing of the rectified voltage may, if desired, be accomplished by filter networks of circuit elements inductive to the radio-frequency energy (not shown) and by further radio-frequency by-pass condensers (not shown), as is well known in the art.

Figure 18:
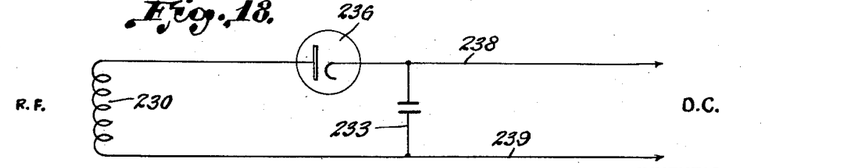

This type of receiving system is the very-high-frequency analogy of the rectifying system of Fig. 18, customarily used in radio-frequency power supplies, where radio-frequency energy is fed into a tuned circuit 230, rectified by a high-voltage rectifier 236, and stored in a capacitor 233. Further filtering and smoothing chokes and condensers (not shown) are often used.

The resultant high-voltage energy may be used for the same purposes as present day high-power energy; for example, for home lighting, factory power, etc.

Where radio-frequency energy is desired, of course, as in commercial high-frequency-heating applications, the radio energy may be piped into the receiving station by wave guides without rectification.

Further modifications will occur to persons skilled in the art, and all such are considered to fall within the spirit and scope of the invention, as defined in the appended claims.

What is claimed is:

1. A power-transmission system, having, in combination, means for generating pulses of high-peak-power ultra-high-frequency radio energy, means for synchronizing the generation of the pulses to cause them to occur successively without break, means for combining the pulses in a common channel, means for radiating the combined radio-energy pulses in a directive beam of continuous high-power energy, means for receiving the radiated beam of energy, means for breaking up the received energy into successive pulses of energy, means for amplifying the pulses obtained by breaking up the received energy, means for combining the amplified pulses in a common channel, and means for re-radiating the combined amplified pulses in a directive beam of continuous amplified high-power energy.

2. A power-transmission system, having, in combination, means for generating pulses of high-peak-power ultra-high-frequency radio energy, means for synchronizing the generation of the pulses to cause them to occur successively without break, means for combining the pulses in a common wave-guiding channel, means for propagating the combined radio-energy pulses as continuous high-power energy along a further wave-guiding channel, means for receiving the propagated energy, means for breaking up the received energy into successive pulses of energy, means for amplifying the pulses obtained by breaking up the received energy, means for combining the amplified pulses in a common channel, and means for re-propagating the combined amplified pulses as continuous amplified high-power energy.

3. An electric system having, in combination, a two-dimensional array of wave guides, a plurality of ultra-high-frequency radio-energy translating devices, one located in each wave guide, and a plurality of ultra-high-frequency radio energy transmitters, one connected to each translating device.

4. An electric system having, in combination, a two-dimensional array of wave guides, a plurality of ultra-high-frequency radio energy translating devices, one located in each wave guide, a plurality of ultra-high-frequency radio energy circuits, one connected to each translating device, and a common wave guide with which all of the wave guides of the array of wave guides cooperate.

5. An electric system having, in combination, a two-dimensional array of wave guides, a plurality of ultra-high-frequency radio energy translating devices, one located in each wave guide, a plurality of ultra-high-frequency radio energy circuits, one connected to each translating device, a flared wave guide with the larger end of which all of the wave guides of the array of wave guides cooperate, and a further wave guide connected to the smaller end of the flared wave guide.

6. An electric system having, in combination, a two-dimensional array of wave guides, a plurality of ultra-high-frequency radio energy translating devices, one located in each wave guide, a plurality of ultra-high-frequency radio energy circuits, one connected to each translating device, a flared wave guide with the larger end of which all of the wave guides cooperate, a further wave guide connected to the smaller end of the flared wave guide, and a directive antenna system connected to the further wave guide.

7. A power-transmission system, having, in combination, means for generating pulses of high-peak-power ultra-high-frequency radio energy, means for synchronizing the generation of the pulses to cause them to occur successively without break, means for combining the pulses in a common channel, means for radiating the combined radio-energy pulses in a directive beam of continuous high-power energy, means for receiving the radiated beam of energy comprising a plurality of wave guides each having an end exposed to permit the reception of ultra-high-frequency radio energy, the said ends of the wave guides being disposed in consecutive order, and a further wave guide having an end movable to positions adjacent the said ends of the successive wave guides of the plurality of wave guides in order to cooperate therewith to feed ultra-high-frequency radio energy thereto, means for moving the further wave guide to cause its said end to cooperate in consecutive order with the said ends of the successive wave guides of the plurality of wave guides, means for amplifying the energy fed from the further wave guide to the successive wave guides of the plurality of wave guides, means for combining the amplified energy from all of the wave guides of the plurality of wave guides in a common channel, and means for re-radiating the combined amplified pulses in a directive beam of continuous amplified high-power energy.

8. The method of producing continuous-level high-power ultra-high-frequency radio energy that comprises storing energy at a plurality of points, discharging the energy stored at the plurality of points in succession to produce a plurality of pulses, controlling the pulse width of each pulse to terminate the same at substantially the time of the commencement of the next successive pulse in order to cause the pulses to occur successively without break, producing in response to and for the complete period of each successive pulse a pulse of high-peak-power ultra-high-frequency radio-energy oscillations, and combining the radio-energy pulses in a common channel.

9. The method of producing high-power radio energy that comprises storing energy at a plurality of points, discharging the energy stored at the plurality of points in succession to produce a plurality of pulses, controlling the pulse width of each pulse to terminate the same at substantially the time of the commencement of the next successive pulse in order to cause the pulses to occur successively without break, and producing in response to and for the complete period of each successive pulse a pulse of high-peak-power radio-energy oscillations, thereby to produce high-power radio energy continuously.

10. The method of producing continuous-level high-power ultra-high-frequency radio energy that comprises generating direct-current pulses of substantially equal amplitude, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power ultra-high-frequency radio-energy oscillations, and combining the radio-energy pulses in a common channel.

11. The method of producing high-power radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, and producing in response to and for the complete period of each successive direct-current pulse a pulse of high-peak-power radio-energy oscillations, thereby to produce high-power radio energy continuously.

12. The method of producing continuous-wave high-power ultra-high-frequency radio energy with the aid of a plurality of ultra-high-frequency high-peak-power radio generators that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, pulsing each successive radio generator in response to and for the complete period of each successive direct-current pulse to produce without break successive pulses of high-peak-power ultra-high-frequency radio-energy oscillations, and combining the radio-energy pulses in a common channel.

13. The method of producing high-power radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power radio-energy oscillations, combining the radio-energy pulses in a common channel, and radiating the same as a continuous-wave directive beam of high-power radio energy.

14. The method of producing high-power radio energy that comprises storing energy at a plurality of points, discharging the energy stored at the plurality of points in succession to produce a plurality of pulses, controlling the pulse width of each pulse to terminate the same at substantially the time of the commencement of the next successive pulse in order to cause the pulses to occur successively without break, producing in response to and for the complete period of each successive pulse a pulse of high-peak-power ultra-high-frequency radio-energy oscillations, combining the radio-energy pulses in a common channel, and radiating the same as a continuous-wave directive beam of high-power radio energy.

15. The method of producing continuous-level high-power ultra-high-frequency radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power ultra-high-frequency radio-energy oscillations, feeding each radio-energy pulse to a separate channel, and combining the radio-energy outputs of the separate channels in a common channel.

16. The method of producing continuous-level high-power ultra-high-frequency radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power ultra-high-frequency radio-energy oscillations, feeding each radio-energy pulse to a separate channel, combining the radio-energy outputs of the separate channels in a common channel, and radiating the combined radio-energy outputs in a continuous directive beam of high-power radio energy.

17. The method of producing high-power ultra-high-frequency radio energy that comprises generating a plurality of direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, varying the amplitude of the successive pulses, producing in response to and for the complete period of each successive direct-current pulse a pulse of high-peak-power ultra-high-frequency radio-energy oscillations corresponding in amplitude to the amplitude of the corresponding direct-current pulse, and combining the radio-energy pulses in a common channel.

18. The method of producing high-power radio energy that comprises storing energy at a plurality of points, discharging the energy stored at the plurality of points in succession to produce a plurality of pulses, controlling the pulse width of each pulse to terminate the same at substantially the time of the commencement of the next successive pulse in order to cause the pulses to occur successively without break, varying the amplitude of the successive pulses, and producing in response to and for the complete period of each successive pulse a pulse of high-peak-power radio-energy oscillations, thereby to produce continuously high-power radio energy of varying level.

19. The method of producing high-power radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power radio-energy oscillations, thereby to produce high-power radio energy continuously, combining the radio-energy pulses in a common channel, and varying the conductivity of the channel.

20. The method of producing high-power radio energy that comprises generating a plurality of direct-current pulses, synchronizing the generation of the direct-current pulses to cause them to occur one after the other, controlling the pulse width of each direct-current pulse to terminate the same a short time after the commencement of the next successive pulse, and producing a pulse of high-peak-power radio-energy oscillations in response to and for the complete period of each successive direct-current pulse, thereby to produce high-power radio energy continuously.

21. The method of producing continuous-wave high-power ultra-high-frequency radio energy with the aid of a plurality of ultra-high-frequency high-peak-power radio generators that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, pulsing each successive radio generator in response to and for the complete period of each successive direct-current pulse to produce without break successive pulses of high-peak-power ultra-high-frequency radio-energy oscillations, combining the radio-energy pulses in a common wave-guiding channel, and propagating the high-power radio-energy pulses as continuous high-power energy along a further wave-guiding channel.

22. The method of producing high-power radio energy that comprises generating direct-current pulses, synchronizing the generation of the direct-current pulses to cause them to occur one after the other, controlling the pulse width of each direct-current pulse to terminate the same at substantially the time of the commencement of the next successive pulse in order to cause the direct-current pulses to occur successively without break, producing in response to and for the complete period of each successive direct-current pulse a pulse of high-peak-power radio-energy oscillations, feeding each radio-energy pulse to a separate channel, combining the radio-energy outputs of the separate channels in a common wave-guiding channel, and propagating the high-power radio-energy pulses as continuous high-power energy along a further wave-guiding channel.

23. An electric system for producing continuous-level high-power ultra-high-frequency radio energy having, in combination, a plurality of energy-storage means, means for discharging the energy stored by the plurality of energy-storage means in succession to produce a plurality of pulses, means for controlling the pulse width of each pulse to terminate the same at substantially the time of the commencement of the next successive pulse in order to cause the pulses to occur successively without break, a plurality of high-peak-power ultra-high-frequency radio generators, one corresponding to each of the energy-storage means, means for pulsing each of the successive generators in response to and for the complete period of each successive pulse to produce a succession of pulses of high-peak-power ultra-high-frequency radio-energy oscillations without break, and means for combining the radio-energy pulses in a common channel.

24. An electric system for producing high-power radio energy having, in combination, a plurality of energy-storage means, means for discharging the energy stored by the plurality of energy-storage means in succession to produce a plurality of pulses, means for controlling the pulse width of each pulse to terminate the same at substantially the time of the commencement of the next successive pulse in order to cause the pulses to occur successively without break, a plurality of radio generators, one corresponding to each of the energy-storage means, and means for pulsing each of the successive generators in response to and for the complete period of each successive pulse to produce a succession of pulses of high-peak-power radio-energy oscillations without break.

25. An electric system for producing continuous-level high-power ultra-high-frequency radio energy having, in combination, means for generating a plurality of direct-current pulses, means for synchronizing the generation of the direct-current pulses to cause them to occur one after the other, means for controlling the pulse width of each direct-current pulse to terminate the same at substantially the time of the commencement of the next successive pulse in order to cause the direct-current pulses to occur successively without break, a plurality of high-peak-power ultra-high-frequency radio generators, means for pulsing each of the successive generators in response to and for the complete period of each successive direct-current pulse to produce a succession of pulses of high-peak-power ultra-high-frequency radio-energy oscillations without break, and means for combining the radio-energy pulses in a common channel.

26. An electric system for producing high-power radio energy having, in combination, means for generating a plurality of direct-current pulses, means for synchronizing the generation of the direct-current pulses to cause them to occur one after the other, means comprising pulse-transmission-line means for controlling the pulse width of each direct-current pulse to terminate the same at substantially the time of the commencement of the next successive pulse in order to cause the direct-current pulses to occur successively without break, a plurality of radio generators, and means for pulsing each of the successive generators in response to and for the complete period of each successive direct-current pulse to produce a succession of pulses of high-peak-power radio-energy oscillations without break.

27. An electric system for producing continuous-level high-power ultra-high-frequency radio energy having, in combination, means for generating a plurality of direct-current pulses, means for synchronizing the generation of the direct-current pulses to cause them to occur one after the other, means for controlling the pulse width of each direct-current pulse to terminate the same at substantially the time of the commencement of the next successive pulse in order to cause the direct-current pulses to occur successively without break, a plurality of high-peak-power ultra-high-frequency radio generators, means for pulsing each of the successive generators in response to and for the complete period of each successive direct-current pulse to produce a succession of pulses of high-peak-power ultra-high-frequency radio-energy oscillations without break, a plurality of wave-guides, one corresponding to each of the radio generators, for channeling the radio-energy pulse of each radio generator in a separate wave-guide channel, and common wave-guide means for combining the outputs of the separate wave-guide channels.

28. An electric system for producing continuous-level high-power ultra-high-frequency radio energy having, in combination, means for generating a plurality of direct-current pulses, means for synchronizing the generation of the direct-current pulses to cause them to occur one after the other, means for controlling the pulse width of each direct-current pulse to terminate the same at substantially the time of the commencement of the next successive pulse in order to cause the direct-current pulses to occur successively without break, a plurality of high-peak-power ultra-high-frequency radio generators, means for pulsing each of the successive generators in response to and for the complete period of each successive direct-current pulse to produce a succession of pulses of high-peak-power ultra-high-frequency radio-energy oscillations without break, means comprising a two-dimensional array of wave guides, one corresponding to each of the plurality of radio generators, a plurality of ultra-high-frequency radio-energy translating devices, one located in each wave guide, means for connecting each of the translating devices to one of the radio generators to channel the radio-energy pulse of each radio generator in a separate wave guide, and means for combining the outputs of the separate wave-guide channels in a common channel.

29. An electric system for producing continuous-level high-power ultra-high-frequency radio energy having, in combination, means for generating a plurality of direct-current pulses, means for synchronizing the generation of the direct-current pulses to cause them to occur one after the other, means for controlling the pulse width of each direct-current pulse to terminate the same at substantially the time of the commencement of the next successive pulse in order to cause the direct-current pulses to occur successively without break, a plurality of high-peak-power ultra-high-frequency radio generators, means for pulsing each of the successive generators in response to and for the complete period of each successive direct-current pulse to produce a succession of pulses of high-peak-power ultra-high-frequency radio-energy oscillations without break, means for combining the radio-energy pulses in a common channel, means for radiating the combined radio-energy pulses in a directive beam of continuous high-power radio energy, and a plurality of means for receiving the radiated beam.

30. An electric system for producing continuous-level high-power ultra-high-frequency radio energy having, in combination, a plurality of direct-current-pulse generators, one for generating each of a plurality of direct-current pulses, means for synchronizing the generation of the direct-current pulses to cause them to occur one after the other, means for controlling the pulse width of each direct-current pulse to terminate the same at substantially the time of the commencement of the next successive pulse in order to cause the direct-current pulses to occur successively without break, a plurality of high-peak-power ultra-high-frequency radio generators, means connecting each of the plurality of direct-current pulse generators directly to one of the plurality of high-peak-power ultra-high-frequency radio generators for pulsing each of the successive generators in response to and for the complete period of each successive direct-current pulse to produce a succession of pulses of high-peak-power ultra-high-frequency radio-energy oscillations without break, means for combining the radio-energy pulses in a common channel, means for radiating into space the combined radio-energy pulses in a directive field pattern, and a plurality of receiving means having directive receptive field patterns that intercept substantially all of the space radiated field pattern.

References Cited in the file of this patent

UNITED STATES PATENTS

| Number | Name | Date |
|---|---|---|
| 1,510,624 | Kloneck | Oct. 7, 1924 |
| 2,021,557 | Kolarz | Nov. 19, 1935 |
| 2,086,351 | Callahan | July 6, 1937 |
| 2,167,247 | Mathes | July 25, 1939 |
| 2,206,683 | Wolff | July 2, 1940 |
| 2,216,707 | George | Oct. 1, 1940 |
| 2,223,058 | Christ | Nov. 26, 1940 |
| 2,334,189 | Goldstine | Nov. 16, 1943 |
| 2,337,184 | Carter | Dec. 21, 1943 |
| 2,369,268 | Trevor | Feb. 13, 1945 |
| 2,375,223 | Hansen et al. | May 8, 1945 |
| 2,398,095 | Katzin | Apr. 9, 1946 |
| 2,405,069 | Tonks | July 30, 1946 |
| 2,411,299 | Sloan | Nov. 19, 1946 |
| 2,414,265 | Lawson | Jan. 14, 1947 |
| 2,423,508 | Leck | July 8, 1947 |
| 2,425,315 | Atwood et al. | Aug. 12, 1947 |
| 2,425,316 | Dow | Aug. 12, 1947 |
| 2,471,418 | Earp | May 31, 1949 |
| 2,478,920 | Hansell | Aug. 16, 1949 |
| 2,480,829 | Barrow et al. | Sept. 6, 1949 |
| 2,495,429 | Spencer | Jan. 24, 1950 |
| 2,507,176 | Posthumus | May 9, 1950 |
| 2,544,715 | Muchmore | Mar. 13, 1951 |
| 2,562,277 | Koch | July 31, 1951 |
| 2,563,990 | Cutler | Aug. 14, 1951 |

FOREIGN PATENTS

| Number | Country | Date |
|---|---|---|
| 119,051 | Australia | Oct. 26, 1944 |